(12) United States Patent
Kawai

(10) Patent No.: US 12,469,107 B2
(45) Date of Patent: Nov. 11, 2025

(54) IMAGE CAPTURING APPARATUS AND IMAGE CAPTURING METHOD FOR GENERATING HIGH-RESOLUTION IMAGE, AND NON-TRANSITORY COMPUTER-READABLE STORAGE MEDIUM STORING PROGRAM

(71) Applicant: CANON KABUSHIKI KAISHA, Tokyo (JP)

(72) Inventor: Yusuke Kawai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 18/487,709

(22) Filed: Oct. 16, 2023

(65) Prior Publication Data

US 2024/0127398 A1    Apr. 18, 2024

(30) Foreign Application Priority Data

Oct. 17, 2022   (JP) ................. 2022-166157

(51) Int. Cl.
  *G06T 3/4053* (2024.01)
  *G06V 10/25* (2022.01)
  *H04N 23/60* (2023.01)

(52) U.S. Cl.
  CPC ............ *G06T 3/4053* (2013.01); *G06V 10/25* (2022.01); *H04N 23/64* (2023.01)

(58) Field of Classification Search
  CPC ....... G06T 3/4053; G06T 3/4069; G06T 5/50; G06T 3/4007; G06T 2207/20221; G06T 3/4015; G06V 10/25; H04N 23/64; H04N 23/69; H04N 23/951; H04N 25/48; H04N 23/843; H04N 25/134; H04N 23/741; H04N 23/12; H04N 23/71; H04N 25/13; H04N 5/265; H04N 23/10; H04N 23/45; H04N 1/40068

See application file for complete search history.

(56) References Cited

U.S. PATENT DOCUMENTS

| | | | | |
|---|---|---|---|---|
| 7,944,486 B2* | 5/2011 | Tanaka | .................. | H04N 23/84 348/230.1 |
| 8,878,950 B2* | 11/2014 | Lelescu | ................ | H04N 23/951 348/218.1 |
| 9,538,085 B2* | 1/2017 | Choi | .................... | H04N 23/698 |
| 9,674,430 B1* | 6/2017 | Li | ........................ | H04N 23/683 |
| 10,491,815 B2* | 11/2019 | Kajimura | ............... | H04N 25/13 |
| 10,846,824 B2* | 11/2020 | Kumar | ..................... | G06T 5/70 |
| 11,445,109 B2* | 9/2022 | Furukawa | ............. | H04N 23/951 |
| 11,653,107 B2* | 5/2023 | Masamura | ............... | G02B 7/38 348/345 |

(Continued)

FOREIGN PATENT DOCUMENTS

JP     2008054267 A    3/2008

*Primary Examiner* — Michael S Osinski
(74) *Attorney, Agent, or Firm* — Canon U.S.A., Inc. IP Division

(57) ABSTRACT

An image capturing apparatus includes an image sensor configured to capture a plurality of images according to a method for pixel shifting and at least one processor. The at least one processor is configured to determine a first region in each of the plurality of images, determine a number of times of image capturing based on the first region, set a pixel shift amount in the pixel shifting based on the number of times of image capturing, and synthesize the first regions of the plurality of images.

8 Claims, 3 Drawing Sheets

(56) References Cited

U.S. PATENT DOCUMENTS

| | | | |
|---|---|---|---|
| 11,936,987 B2* | 3/2024 | Ogushi | H04N 23/71 |
| 12,028,624 B2* | 7/2024 | Aldridge | H04N 23/951 |
| 12,307,631 B2* | 5/2025 | Chen | G06T 3/4053 |
| 12,372,744 B2* | 7/2025 | Lee | G02B 9/60 |
| 2010/0073732 A1* | 3/2010 | Matsunaga | H04N 1/40068 |
| | | | 358/447 |
| 2010/0079684 A1* | 4/2010 | Saigo | G06T 5/73 |
| | | | 348/E3.048 |
| 2010/0289888 A1* | 11/2010 | Ogihara | H04N 23/71 |
| | | | 348/222.1 |
| 2011/0228123 A1* | 9/2011 | Matsumoto | H04N 23/635 |
| | | | 348/222.1 |
| 2012/0098984 A1* | 4/2012 | Hara | H04N 25/00 |
| | | | 348/E5.025 |
| 2013/0222641 A1* | 8/2013 | Honda | H04N 23/81 |
| | | | 348/231.99 |
| 2013/0279826 A1* | 10/2013 | Chuang | G06T 3/4069 |
| | | | 382/299 |
| 2013/0308877 A1* | 11/2013 | Tezuka | G06T 3/4007 |
| | | | 382/300 |
| 2013/0329120 A1* | 12/2013 | Hiasa | H04N 23/80 |
| | | | 348/345 |
| 2014/0078346 A1* | 3/2014 | Imade | H04N 25/48 |
| | | | 348/234 |
| 2014/0267890 A1* | 9/2014 | Lelescu | H04N 25/70 |
| | | | 348/373 |
| 2014/0368682 A1* | 12/2014 | Wu | H04N 23/951 |
| | | | 348/218.1 |
| 2015/0310621 A1* | 10/2015 | Matono | H04N 13/239 |
| | | | 348/47 |
| 2016/0014354 A1* | 1/2016 | Fukuda | G06T 5/50 |
| | | | 348/273 |
| 2017/0006229 A1* | 1/2017 | Ishikawa | H04N 23/951 |
| 2017/0019615 A1* | 1/2017 | Yeh | G06T 3/4053 |
| 2017/0111566 A1* | 4/2017 | Nemoto | H04N 23/80 |
| 2017/0124683 A1* | 5/2017 | Imagawa | H04N 23/951 |
| 2017/0186140 A1* | 6/2017 | Eguchi | G06T 5/73 |
| 2017/0208264 A1* | 7/2017 | Ajito | G06T 3/4069 |
| 2017/0213319 A1* | 7/2017 | Kurihara | G06T 3/4053 |
| 2017/0223250 A1* | 8/2017 | Ajito | H04N 25/134 |
| 2017/0280070 A1* | 9/2017 | Zhou | H04N 23/683 |
| 2018/0027165 A1* | 1/2018 | Murakita | A61B 1/0655 |
| | | | 348/68 |
| 2018/0068208 A1* | 3/2018 | Arazaki | G06K 15/1836 |
| 2018/0139395 A1* | 5/2018 | Toyoda | H04N 23/673 |
| 2018/0152642 A1* | 5/2018 | Li | H04N 5/265 |
| 2018/0225810 A1* | 8/2018 | Kajimura | G06T 3/4053 |
| 2019/0139197 A1* | 5/2019 | Myokan | G06F 18/22 |
| 2019/0149728 A1* | 5/2019 | Kajimura | H04N 23/951 |
| | | | 348/222.1 |
| 2019/0208122 A1* | 7/2019 | Okazawa | H04N 1/387 |
| 2019/0296062 A1* | 9/2019 | Terauchi | G06F 9/30003 |
| 2020/0120271 A1* | 4/2020 | Furukawa | H04N 23/951 |
| 2020/0120272 A1* | 4/2020 | Furukawa | H04N 25/60 |
| 2020/0175660 A1* | 6/2020 | Iijima | G06T 5/50 |
| 2022/0046171 A1* | 2/2022 | Kumaki | G06N 20/00 |
| 2022/0114697 A1* | 4/2022 | Monden | H04N 9/646 |
| 2023/0063201 A1* | 3/2023 | Li | G06T 3/4046 |
| 2023/0132809 A1* | 5/2023 | Kim | H04N 25/46 |
| | | | 348/207.99 |
| 2024/0029285 A1* | 1/2024 | Tang | G06V 40/166 |
| 2025/0037239 A1* | 1/2025 | Ollila | G06T 5/50 |

* cited by examiner

IMAGE CAPTURING APPARATUS AND IMAGE CAPTURING METHOD FOR GENERATING HIGH-RESOLUTION IMAGE, AND NON-TRANSITORY COMPUTER-READABLE STORAGE MEDIUM STORING PROGRAM

BACKGROUND

Field

The present disclosure relates to an image capturing apparatus and an image capturing method for generating a high-resolution image from a plurality of low-resolution images, and a non-transitory computer-readable storage medium storing a program.

Description of the Related Art

Zooming Methods for a digital camera capturing an image of an object include an optical zoom and an electronic zoom. The electronic zoom is a method for enlarging a captured image by image processing, whereas the optical zoom is a method for enlarging an object image optically captured.

The optical zoom has a limit on enlargement, whereas theoretically, the electronic zoom has no limit on enlargement. However, enlargement by the electronic zoom may result in a decrease in a perceived resolution.

As a technique for solving such a problem, in recent years, there is a super-resolution technique for generating a high-resolution image from a low-resolution image. For example, there is a so-called multi-frame super-resolution technique, which generates a single high-resolution image from a plurality of low-resolution images. From a plurality of low-resolution images corresponding to a Bayer array, an image of the red (R) color component, an image of the green (G) color component, and an image of the blue (B) color component are generated. Each of the images of the same color components is generated by assigning a pixel value of the color component to coordinates corresponding to each pixel of the same color component and interpolating zero-valued pixels at coordinates corresponding to pixels of the other color components in the original low-resolution images. In addition, a high-resolution image of each of the color components is generated by performing enlargement processing on each of the images of the color components. After that, at the coordinates where the zero-valued pixels are interpolated in each of the high-resolution images of the color components, pixel values at corresponding coordinates in the other images are inserted. Then, a single super-resolution image is generated from the high-resolution images of the color components after the insertion of the pixel values. The method described above is referred to as a pixel insertion method.

Japanese Patent Laid-Open No. 2008-54267 discloses a technique called an interpolated pixel insertion method as a multi-frame super-resolution technique. This technique generates a high-resolution enlarged image by generating an interpolated pixel for a low-resolution input image and inserting the interpolated pixel in the input image.

In the multi-frame super-resolution technique described above, a super-resolution image is generated from a plurality of images obtained by repeating both pixel shifting by shifting a sensor and image capturing a predetermined number of times of image capturing. There is a limit on the maximum number of pixels that can be used for an image due to a constraint of a memory equipped in a digital camera.

FIG. 3 is a diagram for explaining zooming of an image captured by a digital camera. In a case where an angle of view when the image illustrated in FIG. 3 is enlarged to the maximum by an optical zoom, that is, an angle of view originally intended to be used, is an angle of view 301, even when the multi-frame super resolution technique is used, the number of times of image capturing may be insufficient due to a constraint of a memory, and a resolution corresponding to the angle of view 301 may not reach a desired level.

SUMMARY

A super-resolution image in which a resolution of a desired region is improved to a limit is generated by reading the desired region from a sensor.

The present disclosure provides an image capturing apparatus that includes an image sensor configured to capture a plurality of images according to a method for pixel shifting and at least one processor. The at least one processor is configured to determine a first region in each of the plurality of images, determine a number of times of image capturing based on the first region, set a pixel shift amount in the pixel shifting based on the number of times of image capturing, and synthesize the first regions of the plurality of images. A perceived resolution of the synthesized first region after the first regions of the plurality of images are synthesized is higher than a perceived resolution of the first region of each of the plurality of images.

Further features of various embodiments of the present disclosure will become apparent from the following description of exemplary embodiments with reference to the attached drawings.

DESCRIPTION OF THE EMBODIMENTS

Hereinafter, embodiments of the present disclosure are described in detail with reference to the accompanying drawings.

Figure 1:
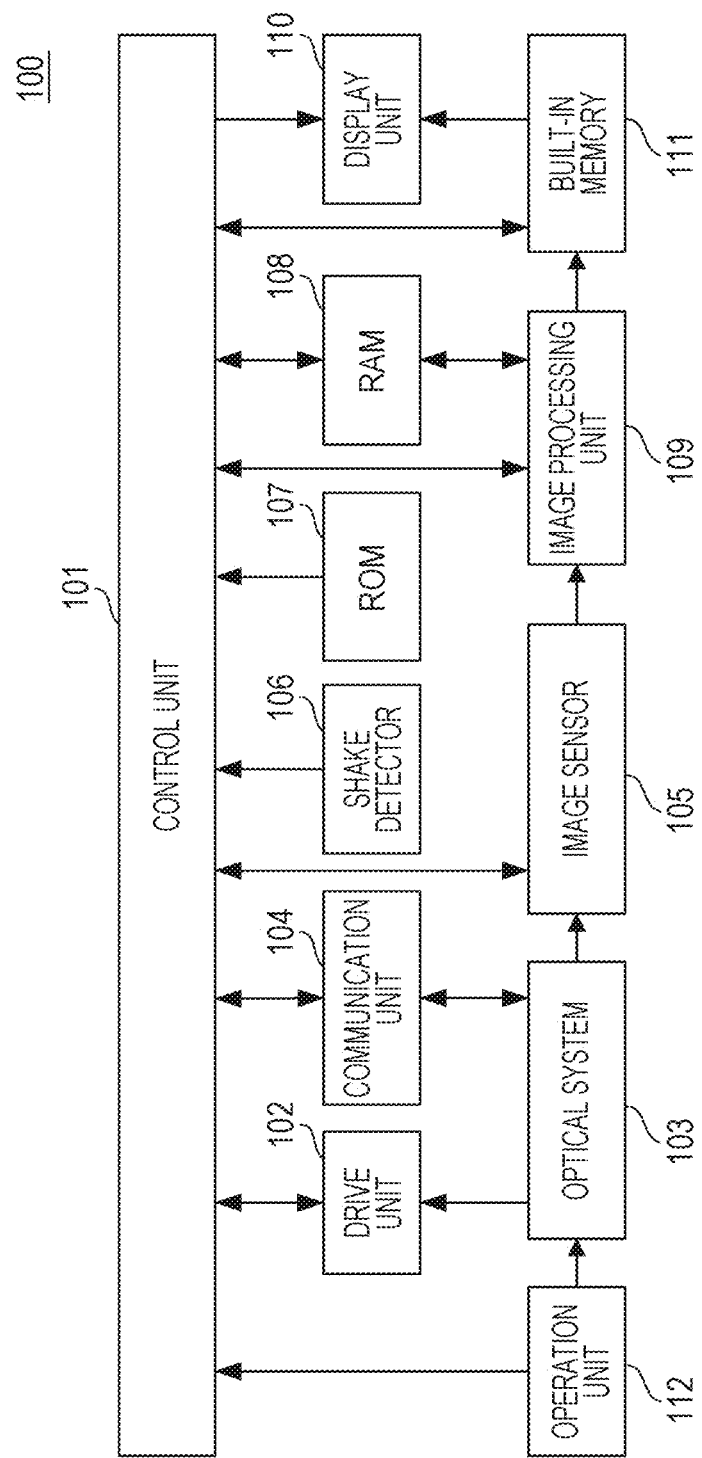
FIG. 1 is a block diagram illustrating a configuration of a digital camera according to an exemplary embodiment.

FIG. 1 is a block diagram illustrating an example of a configuration of a digital camera as an information processing apparatus according to the present embodiment. The digital camera 100 can capture a still image. In addition, the digital camera 100 can record information of a focus position on an image captured by the digital camera 100, calculate a contrast value, and synthesize images. Furthermore, the digital camera 100 can perform enlargement processing or reduction processing on an image captured by and stored in the digital camera 100 or an image externally input to the digital camera 100.

A control unit 101 is, for example, a signal processor, such as a CPU or an MPU, and controls each component of the digital camera 100 while reading a program stored in advance in a ROM 107, which is further described later. For example, as described later, the control unit 101 provides a command to start and end image capturing to an image sensor 105, which is further described later. Also, the digital camera 100 may provide, to an image processing unit 109, which is further described later, a command to perform image processing based on a program stored in the ROM 107. A command from a user is input to the digital camera 100 by an operation unit 112, which is further described later, and reaches each component of the digital camera 100 via the control unit 101.

A drive unit 102 includes a motor and causes an optical system 103, which is further described later, to mechanically operate under a command of the control unit 101. For example, the drive unit 102 moves a focus lens included in the optical system 103 so as to adjust a focal length of the optical system 103 based on a command of the control unit 101.

The optical system 103 includes a zoom lens, the focus lens, and a diaphragm. The diaphragm is a mechanism that adjusts the quantity of light that passes through the diaphragm. The drive unit 102 changes the position of the focus lens so as to enable the optical system 103 to change the focus position.

Mainly under a command of the control unit 101, a communication unit 104 transmits information from the control unit 101 to the optical system 103 and transmits information from the optical system 103 to the control unit 101.

The image sensor 105 is a photoelectric conversion unit and performs photoelectric conversion to convert an incident light signal to an electrical signal. For example, as the image sensor 105, a CCD sensor, a CMOS sensor, or the like can be used. The image sensor 105 can capture a plurality of images that are continuous in terms of time as frames of a motion image.

A shake detector 106 detects a shake applied to the digital camera 100. Generally, as the shake detector 106 that detects a shake or the like, a gyro sensor is used. The gyro sensor detects an angular velocity of a shake applied to the digital camera 100.

The ROM 107 is a read-only nonvolatile memory as a storage medium and stores an operating program for each of blocks included in the digital camera 100, a parameter necessary for an operation of each of the blocks, and the like. A RAM 108 is a rewritable volatile memory and is used as a storage region for temporarily storing data output in the operation of each of the blocks included in the digital camera 100.

The image processing unit 109 performs various types of image processing, such as white balance adjustment, color interpolation, and filtering, on an image output from the image sensor 105 or data of an image signal recorded in a built-in memory 111 described later. In addition, the image processing unit 109 performs compression processing on data of an image signal captured by the image sensor 105 according to a standard, such as JPEG.

The image processing unit 109 includes an integrated circuit (ASIC) formed by integrating circuits that perform specific processing. Alternatively, the control unit 101 may perform processing according to a program read by the control unit 101 from the ROM 107 so as to perform some or all of the functions of the image processing unit 109. In a case where the control unit 101 performs all of the functions of the image processing unit 109, the image processing unit 109 may not be hardware.

A display unit 110 is a liquid crystal display, an organic EL display, or the like and displays an image temporarily stored in the RAM 108, an image stored in the built-in memory 111 described later, a setting screen of the digital camera 100, or the like.

The built-in memory 111 is a memory in which an image captured by the image sensor 105, an image processed by the image processing unit 109, information about the focus position when the image is captured, and the like are recorded. Instead of the built-in memory 111, a memory card or the like may be used.

The operation unit 112 is, for example, a button, a switch, a key, a mode dial, or the like included in the digital camera 100, a touch panel that is also used as the display unit 110, or the like. A command from the user reaches the control unit 101 via the operation unit 112.

Figure 2:
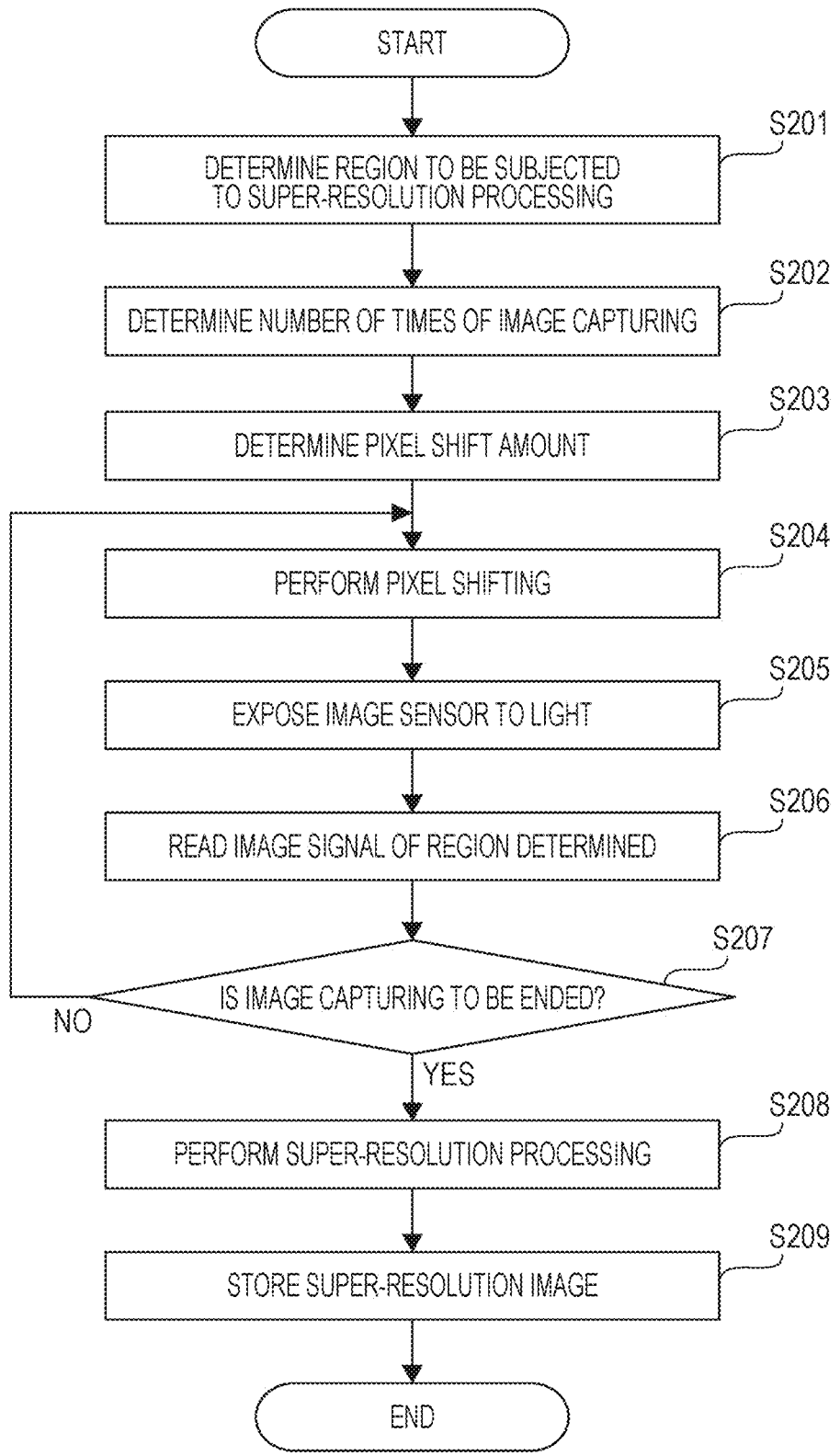
FIG. 2 is a flowchart illustrating a configuration of multi-frame super-resolution processing according to an exemplary embodiment.
Figure 3:
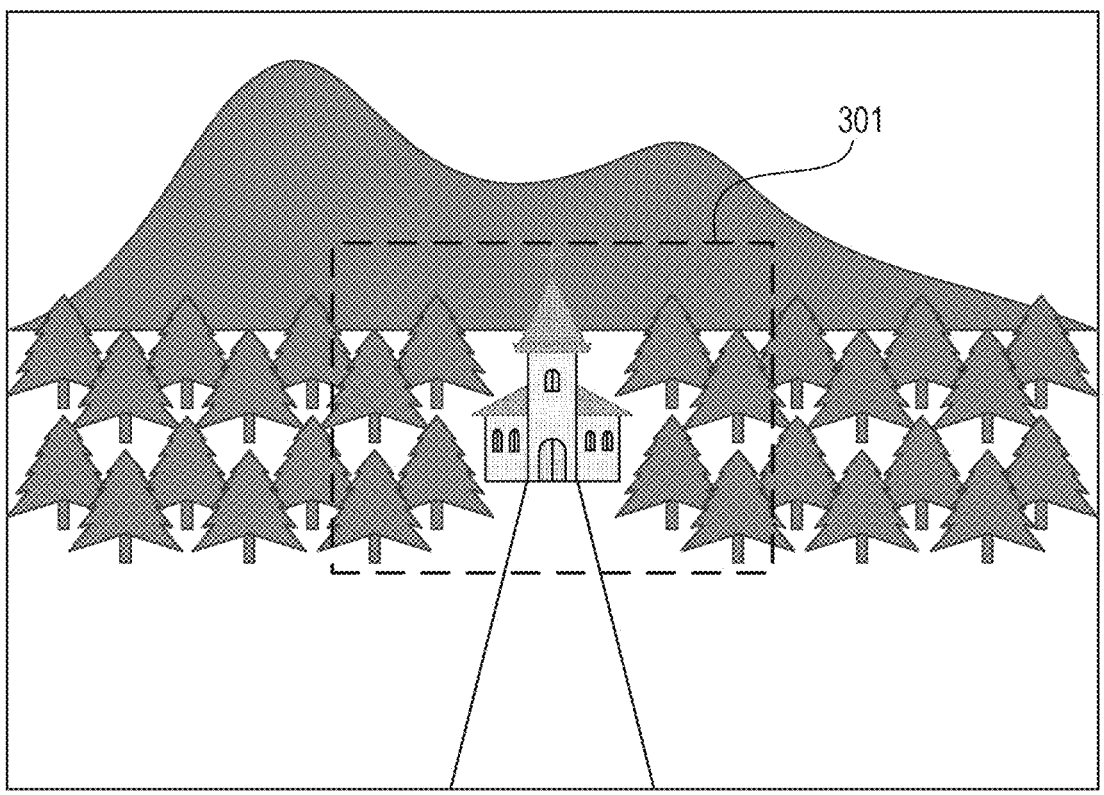
FIG. 3 is a diagram for explaining zooming of an image captured by a digital camera.

FIG. 2 is a flowchart illustrating multi-frame super-resolution processing according to the present embodiment.

First, in step S201, the control unit 101 determines a region to be subjected to super-resolution processing. As a method for determining the region, for example, the region may be designated by the user using the touch panel included in the display unit 110 or may be designated by the user using the key or the like included in the operation unit 112. The size of the region may be appropriately changed. The size of the region may be changed by steps according to a determination unit (described later) that determines the number of times of image capturing.

In step S202, the control unit 101 determines the number of times of image capturing that is performed while pixel shifting.

Some examples of a method for determining the number of times of the image capturing will be described. The first example is a method for determining the number of times of the image capturing such that the number of pixels of the region determined by the control unit 101 in step S201 matches the number of pixels designated by the user.

The second example is a method for determining the number of times of the image capturing such that a perceived resolution of the region determined by the control unit 101 in step S201 does not exceed the resolution capacity of the optical system 103 (resolution limit of a lens). This method determines the number of times of the image capturing based on optical data indicating the resolution limit of the lens and acquired by the control unit 101 from the optical system 103 and optical data of the optical system 103 stored in the ROM 107 by the control unit 101 in advance.

The third example is a method in which the control unit 101 calculates, based on the capacity of the RAM 108 included in the digital camera 100, the maximum image size of an image that can be subjected to the super-resolution processing, and then the control unit 101 determines the number of times of the image capturing based on the maximum image size calculated by the control unit 101 and the number of pixels of the region determined by the control unit 101 in step S201.

The fourth example is a method for determining the number of times of the image capturing based on the region determined by the control unit 101 in step S201 such that the size of images to be captured is to be a recording size set in the digital camera 100 in advance. For example, when the user selects any of image recording sizes S, M, and L set in the digital camera 100 in advance, the control unit 101 determines the number of times of the image capturing based on the image recording size selected by the user.

In step S203, the control unit 101 determines, based on the number of times of the image capturing determined by the control unit 101 in step S202, a pixel shift amount by which the image sensor 105 is moved between the image capturing and the next image capturing. In a case where the image sensor 105 includes an image capturing unit having a color filter with a Bayer array, the pixel shift amount to be obtained can be expressed according to the following Equation (1), where D is a distance between pixels (pixel pitch), n is the number of times of the image capturing, and d is the pixel shift amount to be obtained.

$$d = D \times 2/n \qquad \text{(Equation 1)}$$

In step S204, the control unit 101 moves the image sensor 105 based on the pixel shift amount determined by the control unit 101 in step S203. When the image sensor 105 is completely stopped, the multi-frame super-resolution processing proceeds to step S205.

In step S205, the image sensor 105 is exposed to light.

In step S206, the control unit 101 reads, from the image sensor 105, an image signal of the region determined by the control unit 101 in step S201 and stores the read image signal to the RAM 108.

In step S207, the control unit 101 determines whether or not the number of times of the image capturing performed has reached the number of times of the image capturing determined by the control unit 101 in step S202. In a case where the number of times of the image capturing performed has not reached the number determined by the control unit 101 in step S202, the multi-frame super-resolution processing returns to step S204. In a case where the number of times of the image capturing performed has reached the number determined by the control unit 101 in step S202, the multi-frame super-resolution processing proceeds to step S208.

In step S208, the image processing unit 109 performs the super-resolution processing on a plurality of images read by the control unit 101 in step S206 and including the region determined by the control unit 101 in step S201 so as to generate a super-resolution image.

A method for the super-resolution processing used herein may be the above-described pixel insertion method as a multi-frame super-resolution technique or the interpolated pixel insertion method as described in Japanese Patent Laid-Open No. 2008-54267, and any applicable processing unit may be used for the method for the super-resolution processing.

In step S209, the control unit 101 stores the super-resolution image generated by the image processing unit 109 in step S208. The super-resolution image may be stored in the built-in memory, a memory card, a cloud storage, and the like.

This concludes the description of the flowchart of the multi-frame super-resolution processing illustrated in FIG. 2 according to the present embodiment.

According to the present embodiment, in a case where image capturing for super-resolution image synthesis is performed, the number of times of the image capturing can be determined according to a region of which images are to be synthesized.

OTHER EMBODIMENTS

Although the embodiment is described using the digital camera, the embodiment is not limited to the digital camera. For example, the embodiment may be implemented using a mobile device having an image capturing unit therein or a network camera that can capture an image.

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2022-166157, which was filed on Oct. 17, 2022 and which is hereby incorporated by reference herein in its entirety.

What is claimed is:

1. An image capturing apparatus comprising:
an image sensor configured to capture a plurality of images according to a method for pixel shifting; and
at least one processor configured to:
determine a first region in each of the plurality of images;
determine a number of times of image capturing based on the first region;
set a pixel shift amount in the pixel shifting based on the number of times of image capturing; and
synthesize the first regions of the plurality of images,
wherein a perceived resolution of the synthesized first region after the first regions of the plurality of images are synthesized is higher than a perceived resolution of the first region of each of the plurality of images.

2. The image capturing apparatus according to claim 1, wherein the at least one processor is further configured to determine the number of times of image capturing based on a number of pixels of the synthesized first region after the first regions of the plurality of images are synthesized.

3. The image capturing apparatus according to claim 1, wherein the at least one processor is further configured to determine the number of times of image capturing such that the perceived resolution of the synthesized first region after the first regions of the plurality of images are synthesized does not exceed a resolution limit of a lens.

4. The image capturing apparatus according to claim 1, further comprising a storage unit,
wherein the at least one processor is further configured to determine the number of times of image capturing based on a capacity of the storage unit.

5. The image capturing apparatus according to claim 4, wherein the at least one processor is further configured to determine the number of times of image capturing based on a number of pixels of the first region before the first regions of the plurality of images are synthesized.

6. The image capturing apparatus according to claim 1, wherein the at least one processor is further configured to determine the number of times of image capturing based on a recording size being set.

7. The image capturing apparatus according to claim 6, wherein the at least one processor is further configured to determine the number of times of image capturing based on a number of pixels of the first region before the first regions of the plurality of images are synthesized.

8. A non-transitory computer-readable storage medium storing computer-executable instructions for causing a computer to perform operations that comprise:
- determining a first region in each of a plurality of images;
- determining a number of times of image capturing based on the first region;
- setting a pixel shift amount for pixel shifting based on the number of times of image capturing; and
- synthesizing the first regions of the plurality of images, wherein a perceived resolution of the synthesized first region after the first regions of the plurality of images are synthesized is higher than a perceived resolution of the first region of each of the plurality of images.

* * * * *